United States Patent
Kwatra et al.

(10) Patent No.: US 11,445,369 B2
(45) Date of Patent: Sep. 13, 2022

(54) SYSTEM AND METHOD FOR CREDENTIAL GENERATION FOR WIRELESS INFRASTRUCTURE AND SECURITY

(71) Applicant: International Business Machines Corporation, Armonk, NY (US)

(72) Inventors: Shikhar Kwatra, Durham, NC (US); Adam Lee Griffin, Dubuque, IA (US); Srinivas Babu Tummalapenta, Broomfield, CO (US); Seng Chai Gan, Ashburn, VA (US); HuyAnh Dinh Ngo, Sterling Heights, MI (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 16/800,655

(22) Filed: Feb. 25, 2020

(65) Prior Publication Data
US 2021/0266741 A1 Aug. 26, 2021

(51) Int. Cl.
*H04W 12/06* (2021.01)
*H04B 10/116* (2013.01)
(Continued)

(52) U.S. Cl.
CPC ........ *H04W 12/068* (2021.01); *G06Q 10/025* (2013.01); *G06Q 50/14* (2013.01);
(Continued)

(58) Field of Classification Search
CPC ......... H04W 4/029; H04W 4/42; H04W 4/48; H04W 4/80; H04W 76/11; H04W 12/06; H04W 12/068; H04W 12/63; H04B 10/1149; H04B 10/116; H04B 10/114; G06Q 10/025; G06Q 50/14; G06Q 10/02
See application file for complete search history.

(56) References Cited

U.S. PATENT DOCUMENTS

| | | | |
|---|---|---|---|
| 10,693,557 B1 * | 6/2020 | Ayotte | H04W 4/48 |
| 2011/0033181 A1 * | 2/2011 | Jang | H04B 10/116 |
| | | | 398/43 |

(Continued)

FOREIGN PATENT DOCUMENTS

| | | | | |
|---|---|---|---|---|
| EP | 2940903 A1 * | 11/2015 | | G08C 23/04 |
| WO | WO-2018224575 A1 * | 12/2018 | | H04B 10/1143 |

OTHER PUBLICATIONS

Gila Albert et al., "Which LiFi's apps may fit mostly to 5G and beyond-5G Technology?" Abstract, 2019 Global LiFi Congress (GLC). IEEE, 2019.

(Continued)

*Primary Examiner* — Nathan S Taylor
(74) *Attorney, Agent, or Firm* — Terrile, Cannatti & Chambers, LLP; Emmanuel A. Rivera

(57) ABSTRACT

A method, system and computer-usable medium are disclosed for providing a travel network infrastructure. A dedicated Li-F connection is provided for each physical space such as a seat, expected to accommodate a passenger in a travel network such as an airline. A passenger is authenticated according to a physical space occupied by the passenger. If authentication is successful, a secure Li-Fi channel is established for the passenger. The access point of the Li-Fi channel is only leveraged by the passenger and no other passengers.

14 Claims, 4 Drawing Sheets

(51) Int. Cl.
*H04W 4/029* (2018.01)
*H04W 4/42* (2018.01)
*H04W 4/48* (2018.01)
*H04W 4/80* (2018.01)
*H04W 76/11* (2018.01)
*H04B 10/114* (2013.01)
*G06Q 50/14* (2012.01)
*G06Q 10/02* (2012.01)

(52) U.S. Cl.
CPC ....... *H04B 10/116* (2013.01); *H04B 10/1149* (2013.01); *H04W 4/029* (2018.02); *H04W 4/42* (2018.02); *H04W 4/48* (2018.02); *H04W 4/80* (2018.02); *H04W 76/11* (2018.02)

(56) References Cited

U.S. PATENT DOCUMENTS

| | | | | |
|---|---|---|---|---|
| 2014/0186026 A1* | 7/2014 | Oshima | ................ | H04B 10/116 398/118 |
| 2014/0207517 A1* | 7/2014 | Oshima | ................ | H04N 5/3532 705/7.29 |
| 2014/0226983 A1* | 8/2014 | Vargas | ................ | H04B 10/1149 398/66 |
| 2014/0232903 A1* | 8/2014 | Oshima | .............. | H04B 10/1143 348/229.1 |
| 2014/0286644 A1* | 9/2014 | Oshima | ................. | H04B 10/11 398/118 |
| 2015/0318922 A1* | 11/2015 | Poola | ................... | H04B 10/116 398/45 |
| 2016/0006500 A1 | 1/2016 | Radpour | | |
| 2016/0174241 A1* | 6/2016 | Ansari | ..................... | H01Q 1/32 370/329 |
| 2017/0325111 A1 | 11/2017 | Reese | | |
| 2018/0098215 A1* | 4/2018 | Roberts | .............. | G06K 9/00496 |
| 2018/0116011 A1 | 4/2018 | Yang | | |
| 2018/0191437 A1* | 7/2018 | Cha | ........................ | G06V 10/10 |
| 2018/0205457 A1* | 7/2018 | Scheim | .................. | H04B 10/40 |
| 2019/0297243 A1* | 9/2019 | Oshima | ................ | H04N 5/2353 |
| 2019/0325664 A1* | 10/2019 | Oronte | .................. | H04W 48/08 |
| 2020/0027378 A1* | 1/2020 | Castet | .................... | B64D 43/00 |
| 2020/0028687 A1* | 1/2020 | Castet | ................ | H04W 12/086 |
| 2020/0195343 A1* | 6/2020 | Solanki | ................ | H04W 84/18 |
| 2020/0236088 A1* | 7/2020 | Kärkkäinen | ............ | H04L 63/08 |
| 2020/0266892 A1* | 8/2020 | Schwartz | ........... | H04B 10/1149 |
| 2020/0280827 A1* | 9/2020 | Fechtel | .................... | H04W 4/80 |
| 2020/0324903 A1* | 10/2020 | Morales Anton | ............................. | B64D 11/00155 |
| 2021/0029225 A1* | 1/2021 | Laurenti | .................. | H04L 69/08 |
| 2021/0188165 A1* | 6/2021 | Gagnon Seguin | ....... | B60Q 3/44 |
| 2021/0206464 A1* | 7/2021 | Narvaez-Gracia | ........ | B64C 1/00 |
| 2021/0258350 A1* | 8/2021 | Buck | ................... | H04L 61/1511 |
| 2022/0126864 A1* | 4/2022 | Moustafa | .............. | B60W 50/16 |

OTHER PUBLICATIONS

Mohammad Dehghani Soltani, "Analysis of Random Orientation and User Mobility in LiFi Networks." DISS, (2019).

Mithun Mukherjee et al., "Leveraging light-fidelity for internet of light: State-of-the-art and research challenges." Internet Technology Letters 2.1 (2019): e83.

\* cited by examiner

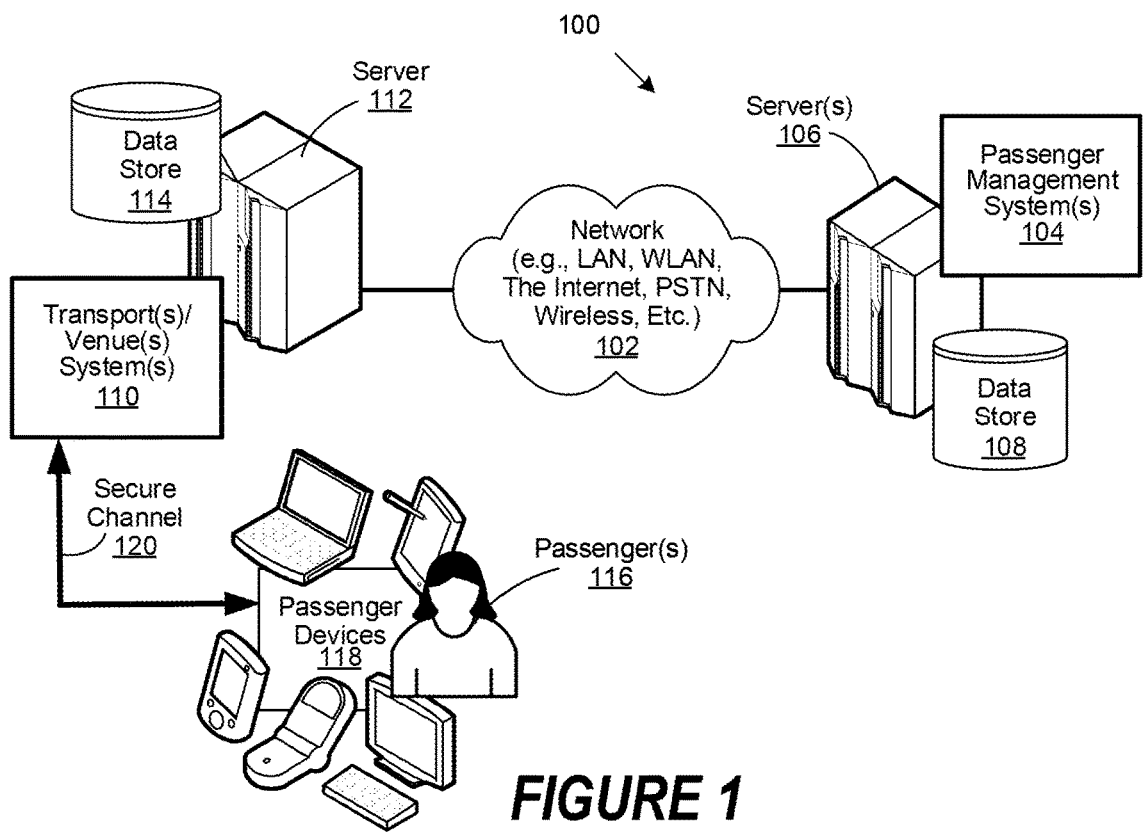
*FIGURE 1*
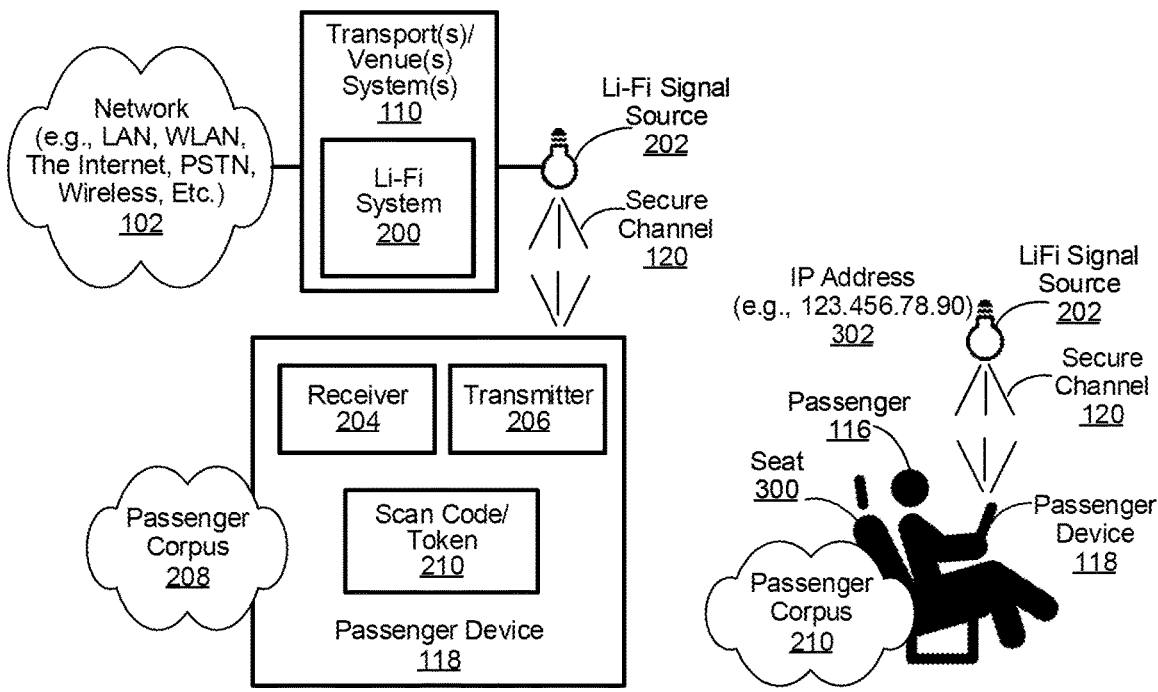
*FIGURE 2*  *FIGURE 3*

SYSTEM AND METHOD FOR CREDENTIAL GENERATION FOR WIRELESS INFRASTRUCTURE AND SECURITY

BACKGROUND OF THE INVENTION

Field of the Invention

The present application relates generally to an improved data processing system and method, and more specifically for mechanisms for credential generation for wireless infrastructure and security.

Description of the Related Art

Wi-Fi, Bluetooth, and other wireless connectivity are in prevalent use in society. Hotspots providing Wi-Fi are available practically everywhere, from coffee shops to bus stops, on commercial transportation, such as trains, at venues, such as airports, etc. Wireless connectivity, and Wi-Fi in particular, is now being provided on a growing number of commercial aircrafts, allowing passengers to remain connected. In-flight wireless access allows passengers to connect for work, access entertainment, and to keep in touch with family and friends.

Public hotspots are shared connections, poorly secured, and are vulnerable to attack and ease dropping. Users are typically unaware of the risks in using such wireless connections. Personal information (PI) and personally identifiable information (PII) can be exposed to others when using public wireless connections.

In applications, such as passenger location tracking, airlines and other agencies may desire to track passengers during travel. In particular, airlines may want to know if a passenger is in their designated seat of the correct flight. Sometimes a passenger has different flight legs, and between such flight legs, the passenger spends time at particular airport(s). The passenger may check in through a wireless connection on the airplane and/or airport; however, since such wireless connections may be unsecure, there are risks that the passenger information/data is compromised. Considering the number of flights that take place, there is a great number of opportunities for passenger information/data to be hacked and compromised.

SUMMARY OF THE INVENTION

A method, system and computer-usable medium are disclosed for providing a travel network infrastructure. A dedicated Li-F connection is provided for each physical space such as a seat, expected to accommodate a passenger in a travel network such as an airline. A passenger is authenticated according to a physical space occupied by the passenger. If authentication is successful, a secure Li-Fi channel is established for the passenger. The access point of the Li-Fi channel is only leveraged by the passenger and no other passengers.

BRIEF DESCRIPTION OF THE DRAWINGS

The present invention may be better understood, and its numerous objects, features, and advantages made apparent to those skilled in the art by referencing the accompanying drawings, wherein:

FIG. 1 depicts an environment for credential generation for wireless infrastructure and security;

FIG. 2 depicts a Li-Fi system connecting with a passenger device;

FIG. 3 depicts a Li-Fi channel dedicated to a passenger seat;

DETAILED DESCRIPTION

Figure 4:
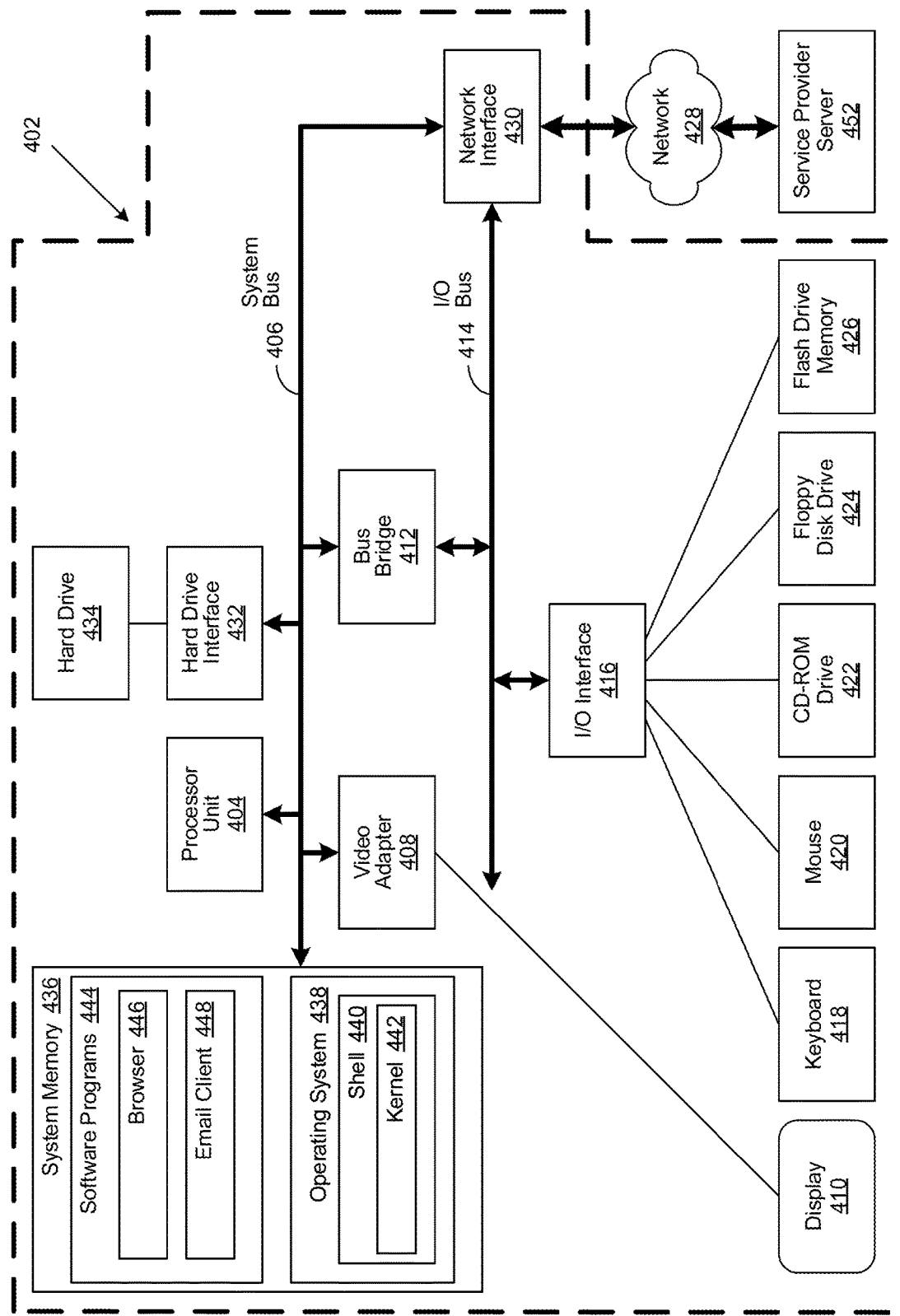
FIG. 4 is a block diagram of an information processing system capable of performing computing operations.

Describe herein are a system and a method to create a personalized, intelligent and secure dedicated channel of wireless, highspeed access (i.e., Internet) for passengers on commercial aircrafts through the use of visible light communication techniques, such as light fidelity or Li-Fi. In certain implementations, the system leverages defined passenger (user, guest) corpus data to spawn or open wireless channels and IP addresses, generate credentials for specific passengers or users, and dynamically ensure connection availability via passenger (user, guest) location tracking and itinerary awareness. Each passenger (user, guest) of an airline is provided with non-shared and dedicated wireless connectivity geofenced specifically to the seat assigned to and occupied by the passenger or guest, as they travel on a given trip.

In certain implementations, the personalized and short-term lifecycles of electronic communication channels leverage a specific passenger's (user, guest) corpus of data which can include travel history, upcoming flight legs, travel plans, reward miles/awards/club status, etc. The specific corpus of data can be used for flight or travel predictability with a secure networks defined geographical presence. In certain implementations, spawning or opening personalized geofenced credentials are performed, based on itinerary guides, seat assignments and/or location awareness related to travel plans. "Loyalty" qualities can be displayed as a specific passenger (user, guest) travels through various legs of trip.

FIG. 1 is a generalized illustration of an environment 100 that can be used to implement the system and method of the present invention. The environment 100 includes a network 102. The network 102 can include Local Area Networks (LANs), Wireless Local Area Networks (WLANs), the Internet, the Public Switched Telephone Network (PSTN), other wireless networks. Network 102 can further include other network topology that can be used to interconnect the elements of environment 100.

In certain embodiments, the network 102 is connected to one or more passenger management systems, as represented by passenger management system(s) 104. Passenger management system(s) 104 can be implemented by ticketing agencies, airlines, airports, or any entity supporting passengers. For other implementations, entities can also be agencies that track guests which are assigned to particular locations, for example hotel guests visiting a hotel where the guests are assigned to particular rooms, concert goers attending performances where seating is assigned, etc. Passenger management system(s) 104 are connected to network 102 through one or more server(s) 106. Data storage as represented by data store 108 can be implemented with passenger system(s) 104. Data store 104 can include passenger corpus data specific to particular passengers as further described below.

The environment 100 further includes transport(s)/ venue(s) system(s) 110 which are connected to the network 102 through one or more server(s) 102. Data storage as represented by data store 114 can be implemented with transport(s)/venue(s) system(s) 110. Transport(s)/venue(s) system(s) 110 can include airplanes, airports, busses, bus stations, ferries, ferry docks, hotels, concert stadium, etc. In general transport(s)/venue(s) system(s) 110 can include vehicles and places where people are assigned seats. In this example, airplanes and airports are described; however, it is to be understood that other implementations can be applied.

Passenger(s) 116 connect with transport(s)/venue(s) system(s) 110 through passenger device(s) 118. Passenger device(s) 118 refer to an information handling system such as a personal computer, a laptop computer, a tablet computer, a personal digital assistant (PDA), a smart phone, a mobile telephone, or other device that is capable of communicating and processing data. Passenger device(s) 118 communicate with transport(s)/venue(s) system(s) 110 through a directed and dedicated secure channel 120. As further discussed below, in certain implementations, the secure channel 120 is Li-Fi channel.

FIG. 2 shows a Li-Fi system connecting with a passenger device. In certain implementations, transport(s)/venue(s) system(s) 110 include a Li-Fi system 200. Light Fidelity or Li-Fi provides high speed bidirectional networked and mobile communication of data using light. A Li-Fi network can include multiple light bulbs, such as Li-Fi signal source 202 that form a wireless network. As to implementation on commercial aircraft, overhead control panels include light sources and can include LED light bulbs that support Li-Fi. LED light bulbs are relatively low in power consumption and can transfer data with speeds up to 224 gigabits per second. Therefore technology, such as 5G can be supported, leveraging full use of bandwidth and supporting applications such as inflight entertainment requiring relatively large amounts of data (e.g., augmented/virtual reality applications). For example, the transport(s)/venue(s) system(s) 110 and Li-Fi system 200 are part of or connected to a 5G network.

The Li-Fi signal source 202 provides the secure channel 120, in the form of a directed and dedicated beam of light. In certain implementations, the secure channel 120 connects with the receiver 204 of the passenger device 118. Passenger device 118 is configured with a transmitter 206 that communicates with the Li-Fi system 200. Li-Fi is a more secure form of wireless communication as compared to Wi-Fi or Bluetooth, since the beam of light used to communicate data can be contained to a physical space which is focused to an area.

In certain implementations, the passenger device 118 includes a passenger corpus 208 that is particular to the specific passenger (i.e., passenger 116) associated with passenger device 118. Passenger corpus 208 can be defined based on passenger history of previous flights, travel frequency, preferred seating assignments, frequent flyer or club membership data, etc. In addition, passenger corpus 208 can be defined by current travel itinerary that includes assigned seats, upcoming flight numbers, Internet of Things (IoT) input (further described below), etc. Passenger corpus 208 can also include Li-Fi access such as passenger/seat tracking, credential and authentication generation, etc. Referring back to FIG. 1, passenger corpuses of various passengers and data/information related to such passenger corpuses can be stored in data stores 108 and 114 of the respective systems.

In certain implementations, the passenger device 118 receives a scan code or Li-Fi token 210 from an airline. Scan code/token 210 is used for passenger authentication. For example, scan code/token 210 may be used for checking in for a flight, boarding an aircraft, and for verification that the correct assigned seat. Scan code/token 210 can be generated for a particular flight itinerary. In certain implementations, the flight itinerary can used for verification. For example, a passenger may book a flight with an airline, and the passenger management system 104 of that airline can generate booking/ticket passes, including the scan code/token 210 for the particular flight itinerary.

FIG. 3 shows a Li-Fi channel dedicated to a passenger seat. In certain implementations, a Li-Fi signal source 202 is dedicated to a particular seat 300. There are multiple seats 300 on a transport/venue system 110, such as a commercial aircraft. Therefore, each seat 300 is assigned or provided with a specific and unique Li-Fi signal source 202. The unique Li-Fi signal source 202 can be identified by a unique address, such as an IP address 302. In certain implementations, passenger corpus 210 of passenger 110 is associated with a seat 300.

FIG. 4 illustrates an information processing system 402, more particularly, a processor and common components, which is a simplified example of a computer system capable of performing the computing operations described herein. For example, the described servers and systems can be implemented as information processing system 402.

Information processing system 402 includes a processor unit 404 that is coupled to a system bus 406. A video adapter 408, which controls a display 410, is also coupled to system bus 406. System bus 406 is coupled via a bus bridge 412 to an Input/Output (I/O) bus 414. An I/O interface 416 is coupled to I/O bus 414. The I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports. The information processing system 402 is able to communicate with a service provider server 438 via network 102 using a network interface 430, which is coupled to system bus 406.

A hard drive interface 432 is also coupled to system bus 406. Hard drive interface 432 interfaces with a hard drive 434. In a preferred embodiment, hard drive 434 populates a system memory 436, which is also coupled to system bus 406. Data that populates system memory 436 includes the information processing system's 402 operating system (OS) 438 and software programs 444.

OS 438 includes a shell 440 for providing transparent user access to resources such as software programs 444. Generally, shell 440 is a program that provides an interpreter and an interface between the user and the operating system. More specifically, shell 440 executes commands that are entered into a command line user interface or from a file. Thus, shell 440 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. While shell 440 generally is a text-based, line-oriented user interface, the present invention can also support other user interface modes, such as graphical, voice, gestural, etc.

As depicted, OS 438 also includes kernel 442, which includes lower levels of functionality for OS 438, including essential services required by other parts of OS 438 and software programs 444, including memory management, process and task management, disk management, and mouse and keyboard management. Software programs 444 may include a browser 446 and email client 448. Browser 446 includes program modules and instructions enabling a World Wide Web (WWW) client (i.e., information processing system 402) to send and receive network messages to the Internet using Hyper Text Transfer Protocol (HTTP) messaging, thus enabling communication with service provider server 428.

The hardware elements depicted in the information processing system 402 are not intended to be exhaustive, but rather are representative to highlight components used by the present invention. For instance, the information processing system 402 may include alternate memory storage devices such as magnetic cassettes, Digital Versatile Disks (DVDs), Bernoulli cartridges, and the like. These and other variations are intended to be within the spirit, scope and intent of the present invention.

Figure 5:
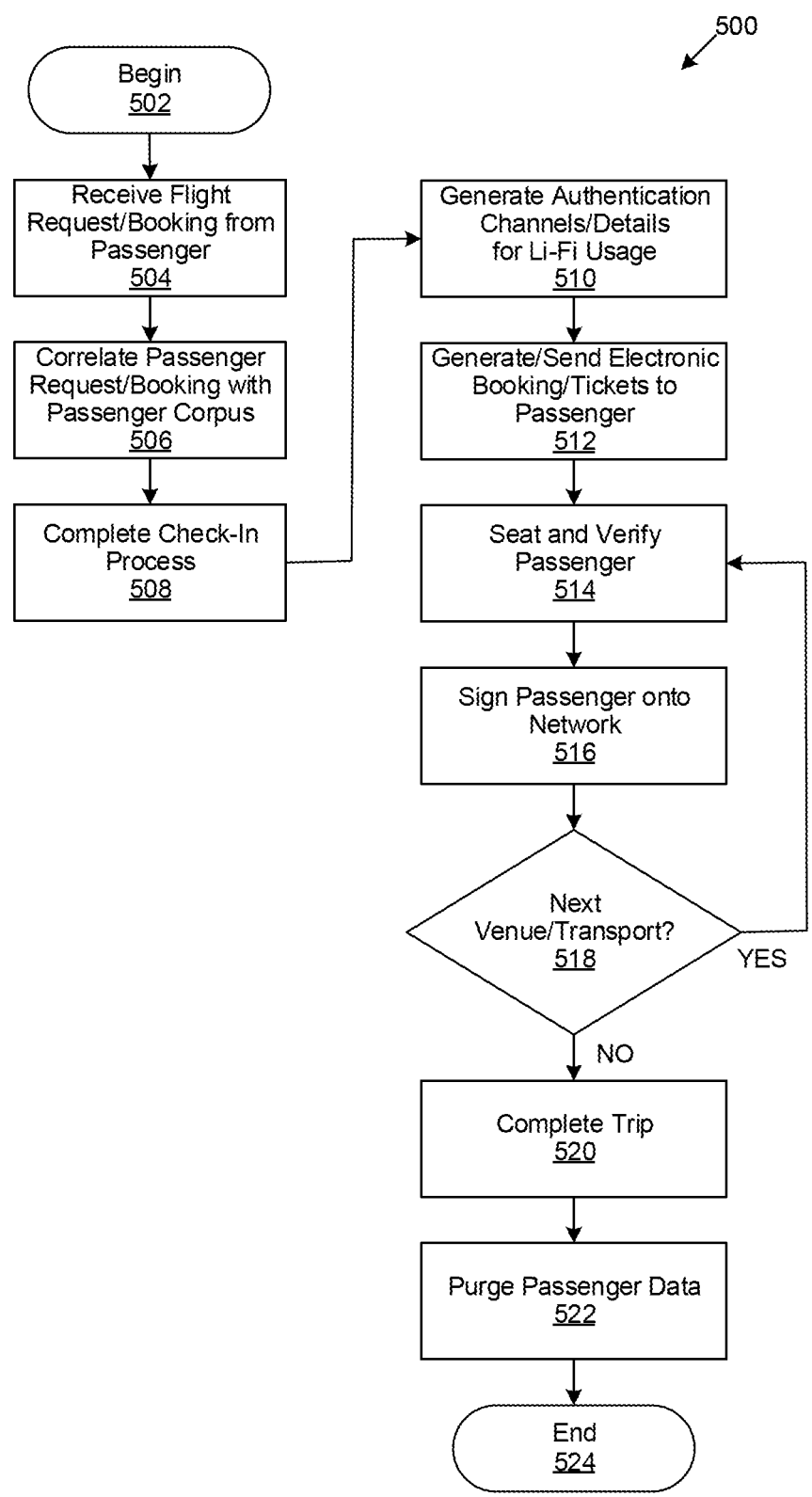
FIG. 5 is a generalized flowchart for credential generation for wireless infrastructure and security.

FIG. 5 is a generalized flowchart 500 for credential generation for wireless infrastructure and security. In particular, a travel network infrastructure is provided that tracks a passenger through a particular flight which can include one or more flight legs and airport layovers. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502 the process 500 starts. At step 504, receipt from a passenger for a flight request/booking is performed. The passenger can contact an airline or other entity that operates a passenger management system, such as passenger management system 104.

At step 506, correlation is performed as to the particular passenger. A system, such as passenger management system 104 recognizes the particular passenger from previous flight details and correlates the request/booking to a defined passenger corpus of data containing histories, personal information, user device registry, and frequent flyer details etc.

At step 508, check-in of the passenger is completed. The check-in completion may be implemented using online/mobile application on a passenger device, provided by an entity, such as an airline.

At step 510, a system, such as passenger management system 104 generates authentication channels/details for Li-Fi usage of the passenger during the flight.

At step 512, generating and sending electronic booking/ticket passes to the passenger is performed. The passenger can receive booking/ticket passes via mobile app to store in mobile wallet of a passenger device. The booking can include appropriate scan codes for airplane boarding and appropriate scan codes for Li-Fi network (Internet) and personal entertainment access.

At step 514, seating and verification of the passenger is performed. Passenger boards plane and locates and sits in their assigned seat, which can be next to other seats/passengers. The passenger holds a Li-Fi scan code (token) and/or device photo-detector below a Li-Fi bi-directional LED/VLC communications system, such as Li-Fi system 200 to complete authentication via a downlink initiation. In certain instances, a passenger may not be in a predetermined (assigned) seat or has changed their seat. Tracking of the passenger can be performed using a series of Internet of Things or IoT sensors (e.g., camera) and/or LiFi Location tracking can determine if a passenger is not in the appropriate assigned seat and dynamically reconfigure IP/connection types based on the passenger's new location.

At step 516, the passenger is signed on to the network. The passenger may be signed on to network under an encrypted, focused and dedicated light stream only available to their seat assignment. Multiple passenger devices 118 may be authenticated based on passenger corpus or profile. In certain instances, manual device connections may be communicated to the passenger when applicable through secondary authentication or generation means.

For certain flight itineraries, layover and aircraft transfers can take place. If there is another venue, such as an airport layover and/or a transfer to another aircraft, following the "YES" branch of block 518, step 514 is performed. In the event the passenger has an airport layover, for example, the passenger may continue an Internet session via their passenger corpus/itinerary in the airline business section of the airport.

If there is no transfer or layover, following the "NO" branch of block 518, at step 520, completion of the trip is performed. At step 522, at the end of the trip all credential/authentication data is purged from all systems. At block 524, the process 500 ends.

Figure 6:
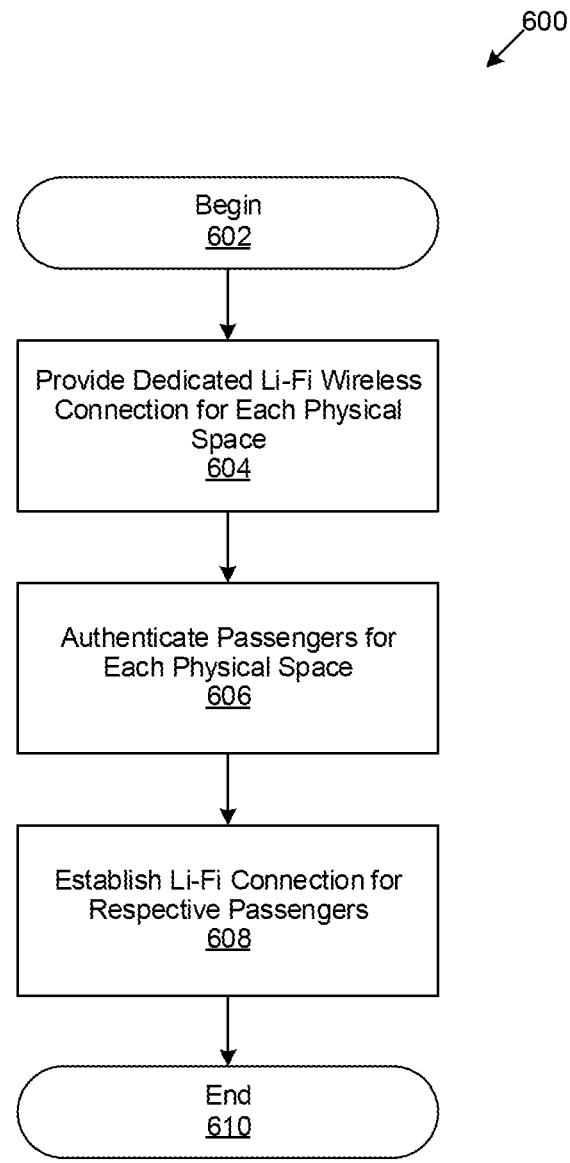
FIG. 6 is a generalized flowchart for authenticating passengers and auditing passenger use of resources in a transport.

FIG. 6 is a generalized flowchart 600 for providing a travel network infrastructure. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602 the process 600 starts. At step 604, a dedicated Li-Fi connection for each physical space is provided. The physical spaces can be assigned seats accommodating passengers in a travel network such as an airline.

At step 606, authentication is performed passengers according to the respective physical space (e.g., seat) they occupy.

At step 608, if the authentication is successful, a secure and dedicated Li-Fi channel is established for the respective passenger. Only the respective passenger is able to leverage an access point of the Li-Fi channel. At block 614, the process 600 ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for providing a travel network infrastructure comprising:

providing a dedicated Light Fidelity (Li-Fi) wireless connection for each physical space expected to accommodate a passenger in a travel network;

authenticating a respective passenger according to a respective physical space occupied by the respective passenger, wherein a scan code is used to authenticate the respective passenger in an airport and/or a subsequent transport in the travel network whereby a network session is maintained during different phases of a passenger itinerary through the travel network; and responsive to a successful authentication, establishing a secure Li-Fi channel for the respective passenger, wherein an access point of the Li-Fi channel is leveraged only by the respective passenger.

2. The method of claim 1, wherein a passenger itinerary is used to authenticate the respective passenger in an airport and/or a subsequent transport in the travel network whereby a network session is maintained during different phases of the passenger itinerary through the travel network.

3. The method of claim 1, wherein the dedicated Li-Fi wireless connection is assigned a unique address.

4. The method of claim 1, wherein a passenger corpus is used to identify the respective passenger.

5. The method of claim 1 further comprising tracking location of the respective passenger, if the respective passenger has changed an assigned physical space.

6. A system comprising:
a processor;
a data bus coupled to the processor; and
a computer-usable medium embodying computer program code, the computer-usable medium being coupled to the data bus, the computer program code used for providing a travel network infrastructure and comprising instructions executable by the processor and configured for:
providing a dedicated Light Fidelity (Li-Fi) wireless connection for each physical space expected to accommodate a passenger in a travel network;
authenticating a respective passenger according to a respective physical space occupied by the respective passenger, wherein a scan code is used to authenticate the respective passenger in an airport and/or a subsequent transport in the travel network whereby a network session is maintained during different phases of a passenger itinerary through the travel network; and
responsive to a successful authentication, establishing a secure Li-Fi channel for the respective passenger, wherein an access point of the Li-Fi channel is leveraged only by the respective passenger.

7. The system of claim 6, wherein the scan code is valid for a specific seat location for a specific duration.

8. The system of claim 6, wherein the dedicated Li-Fi wireless connection is assigned a unique address.

9. The system of claim 6, wherein a passenger corpus is used to identify the respective passenger.

10. The system of claim 6 further comprising tracking location of the respective passenger, if the respective passenger has changed an assigned physical space.

11. A non-transitory, computer-readable storage medium embodying computer program code, the computer program code comprising computer executable instructions configured for:
providing a dedicated Light Fidelity (Li-Fi) wireless connection for each physical space expected to accommodate a passenger in a travel network;
authenticating a respective passenger according to a respective physical space occupied by the respective passenger, wherein a scan code is used to authenticate the respective passenger in an airport and/or a subsequent transport in the travel network whereby a network session is maintained during different phases of a passenger itinerary through the travel network; and
responsive to a successful authentication, establishing a secure Li-Fi channel for the respective passenger, wherein an access point of the Li-Fi channel is leveraged only by the respective passenger.

12. The non-transitory, computer-readable storage medium of claim 11, wherein the dedicated Li-Fi wireless connection is assigned a unique address.

13. The non-transitory, computer-readable storage medium of claim 11, wherein a passenger corpus is used to identify the respective passenger.

14. The non-transitory, computer-readable storage medium of claim 11, further comprising tracking location of the passenger, if the respective passenger has changed an assigned physical space.

* * * * *